United States Patent
Lawrence

(10) Patent No.: US 10,728,616 B2
(45) Date of Patent: Jul. 28, 2020

(54) USER INTEREST-BASED ENHANCEMENT OF MEDIA QUALITY

(71) Applicant: Intel Corporation, Santa Clara, CA (US)

(72) Inventor: Sean J. Lawrence, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/491,052

(22) Filed: Apr. 19, 2017

(65) Prior Publication Data
US 2018/0309955 A1 Oct. 25, 2018

(51) Int. Cl.
| | |
|---|---|
| H04N 21/442 | (2011.01) |
| H04N 21/4402 | (2011.01) |
| H04N 19/17 | (2014.01) |
| H04N 19/162 | (2014.01) |
| H04N 19/00 | (2014.01) |
| H04N 19/115 | (2014.01) |
| H04N 19/164 | (2014.01) |
| H04N 19/154 | (2014.01) |
| G06K 9/00 | (2006.01) |

(52) U.S. Cl.
CPC ....... H04N 21/44218 (2013.01); H04N 19/00 (2013.01); H04N 19/115 (2014.11); H04N 19/154 (2014.11); H04N 19/162 (2014.11); H04N 19/164 (2014.11); H04N 19/17 (2014.11); H04N 21/440245 (2013.01); G06K 9/0061 (2013.01)

(58) Field of Classification Search
CPC ........... H04N 21/44218; H04N 19/154; H04N 19/164; H04N 19/115; H04N 19/00; H04N 19/162; H04N 19/17; H04N 21/440245
See application file for complete search history.

(56) References Cited

U.S. PATENT DOCUMENTS

| 8,184,069 B1 * | 5/2012 | Rhodes | G02B 27/017 345/8 |
| 2004/0013314 A1 * | 1/2004 | Peli | G06T 5/10 382/254 |

(Continued)

OTHER PUBLICATIONS

Goodfellow, et al. "Adaptive Computation and Machine Learning Series", Book, Nov. 18, 2016, pp. 98-165, Chapter 5, The MIT Press, Cambridge, MA.
Ross, et al. "Intel Processor Graphics: Architecture & Programming", Power Point Presentation, Aug. 2015, 78 pages, Intel Corporation, Santa Clara, CA.

(Continued)

Primary Examiner — Jefferey F Harold
Assistant Examiner — Humam M Satti
(74) Attorney, Agent, or Firm — Jaffery Watson Mendonsa & Hamilton LLP

(57) ABSTRACT

A mechanism is described for facilitating interest-based enhancement in media quality according to one embodiment. A method of embodiments, as described herein, includes receiving eye tracking information from a wearable computing device, where the eye tracking information contains data relating to pupils of eyes of a user having access to the wearable computing device. The method may further include enhancing quality of at least contents of media, if a size of a pupil is determined to have been altered due to the user's interest in the contents, where the media having the enhanced contents is encoded and communicated back to the wearable computing device to be rendered at the wearable computing device.

17 Claims, 11 Drawing Sheets

(56) References Cited

U.S. PATENT DOCUMENTS

| | | | | |
|---|---|---|---|---|
| 2010/0124274 | A1* | 5/2010 | Cheok | H04N 19/176 375/240.03 |
| 2012/0314948 | A1* | 12/2012 | Raveendran | H04N 21/23418 382/173 |
| 2013/0147838 | A1* | 6/2013 | Small | G06F 3/013 345/633 |
| 2013/0342640 | A1* | 12/2013 | Li | H04N 7/15 348/14.13 |
| 2014/0079118 | A1* | 3/2014 | Dedeoglu | H04N 19/46 375/240.08 |
| 2014/0123162 | A1* | 5/2014 | Karlsson | H04N 21/4331 725/12 |
| 2015/0016510 | A1* | 1/2015 | Carlsson | H04N 19/15 375/240.03 |
| 2016/0062947 | A1 | 3/2016 | Chetlur et al. | |
| 2017/0293146 | A1* | 10/2017 | Nicholls | G02B 27/0172 |
| 2017/0293356 | A1* | 10/2017 | Khaderi | G09G 5/006 |
| 2017/0302918 | A1* | 10/2017 | Mammou | H04N 19/103 |
| 2019/0019512 | A1* | 1/2019 | Taki | G06F 3/167 |

OTHER PUBLICATIONS

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junking, "The Compute Architecture of Intel Processor Graphics Gen9", paper, Aug. 14, 2015, 22 pages, Version 1.0, Intel Corporation, Santa Clara, CA.

\* cited by examiner

USER INTEREST-BASED ENHANCEMENT OF MEDIA QUALITY

FIELD

Embodiments described herein relate generally to data processing and more particularly to facilitate user interest-based enhancement of media quality.

BACKGROUND

Conventional techniques are negatively influenced by environmental changes, such as ambient light, and thus, such conventional techniques are not equipped to offer an intelligent rendering of media on displays.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for facilitating quality enhancement of one or more portions of media being rendered on a display device based on a user's interest in contents of the one or more portions such that the one or more portions are regarded as a region of interest (ROI) or point of interest (POI). If the user lacks interest, then the media of normal quality is rendered.

In one embodiment, foveated rendering is based on where the user's visual point of interest is located on the display where certain images are being rendered. This ROI may be determined by eye tracking, followed by detecting changes in the size of the user's pupils, where this ROI may be used to enhance the quality of the media contents within and around the ROI being viewed by the user, such as by increasing bitrate.

Figure 1:
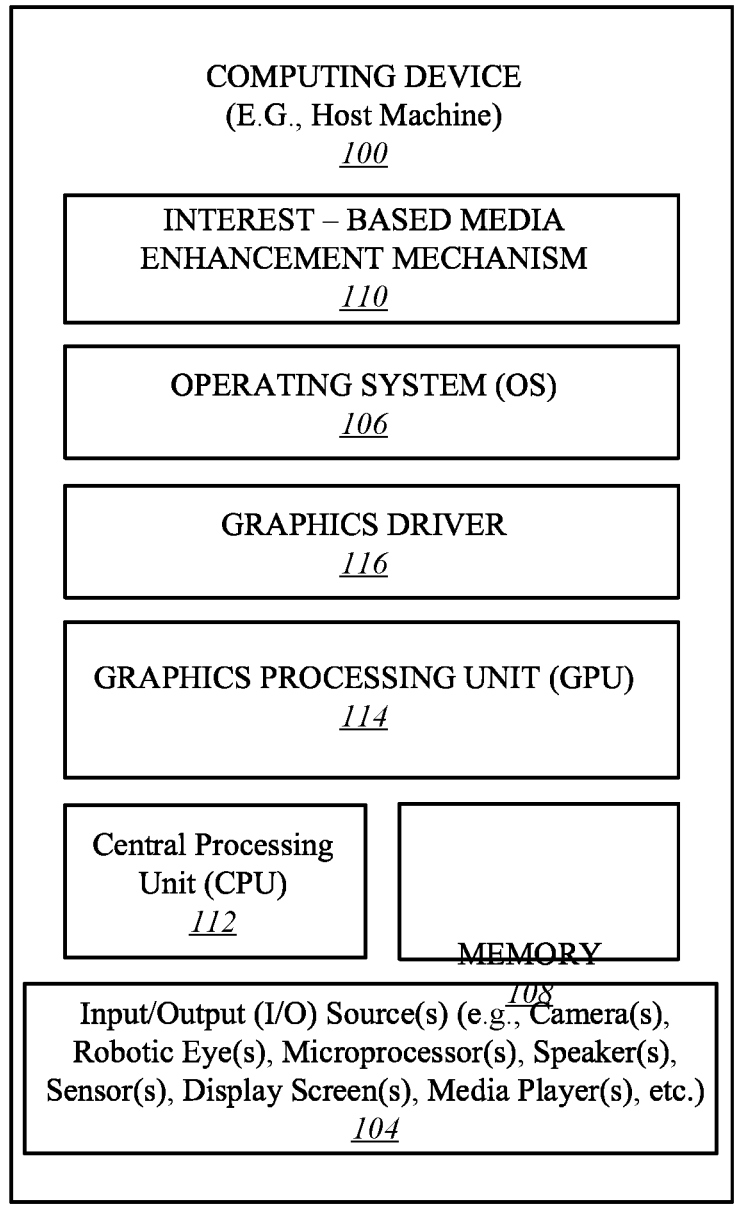
FIG. 1 illustrates a computing device employing an interest-based media enhancement mechanism according to one embodiment.

FIG. 1 illustrates a computing device 100 employing an interest-based media enhancement mechanism ("enhancement mechanism") 110 according to one embodiment. Computing device 100 represents a communication and data processing device including (but not limited to) smart wearable devices, smartphones, virtual reality (VR) devices, head-mounted display (HMDs), mobile computers, Internet of Things (IoT) devices, laptop computers, desktop computers, server computers, etc.

Computing device 100 may further include (without limitations) an autonomous machine or an artificially intelligent agent, such as a mechanical agent or machine, an electronics agent or machine, a virtual agent or machine, an electro-mechanical agent or machine, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Throughout this document, "computing device" may be interchangeably referred to as "autonomous machine" or "artificially intelligent agent" or simply "robot".

Computing device 100 may further include (without limitations) large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 100 may include a mobile computing device employing a computer platform hosting an integrated circuit ("IC"), such as system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computer device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or combinations of software and hardware.

In one embodiment, enhancement mechanism 110 may be hosted or facilitated by operating system 106 of computing device 100. In another embodiment, enhancement mechanism 110 may be hosted by or part of graphics processing unit ("GPU" or simply "graphics processor") 114 or firmware of graphics processor 114. Similarly, in yet another embodiment, enhancement mechanism 110 may be hosted by or part of central processing unit ("CPU" or simply "application processor") 112. In yet another embodiment, enhancement mechanism 110 may be hosted by or part of any number and type of components of computing device 100, such as a portion of enhancement mechanism 110 may be hosted by or part of operating system 106, another portion may be hosted by or part of graphics processor 114, another portion may be hosted by or part of application processor 112, while one or more portions of enhancement mechanism 110 may be hosted by or part of operating system 106 and/or any number and type of devices of computing device 100. It is contemplated that one or more portions or components of enhancement mechanism 110 may be employed as hardware, software, and/or firmware.

It is contemplated that embodiments are not limited to any particular implementation or hosting of enhancement mechanism 110 and that enhancement mechanism 110 and one or more of its components may be implemented as hardware, software, firmware, or any combination thereof Computing device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
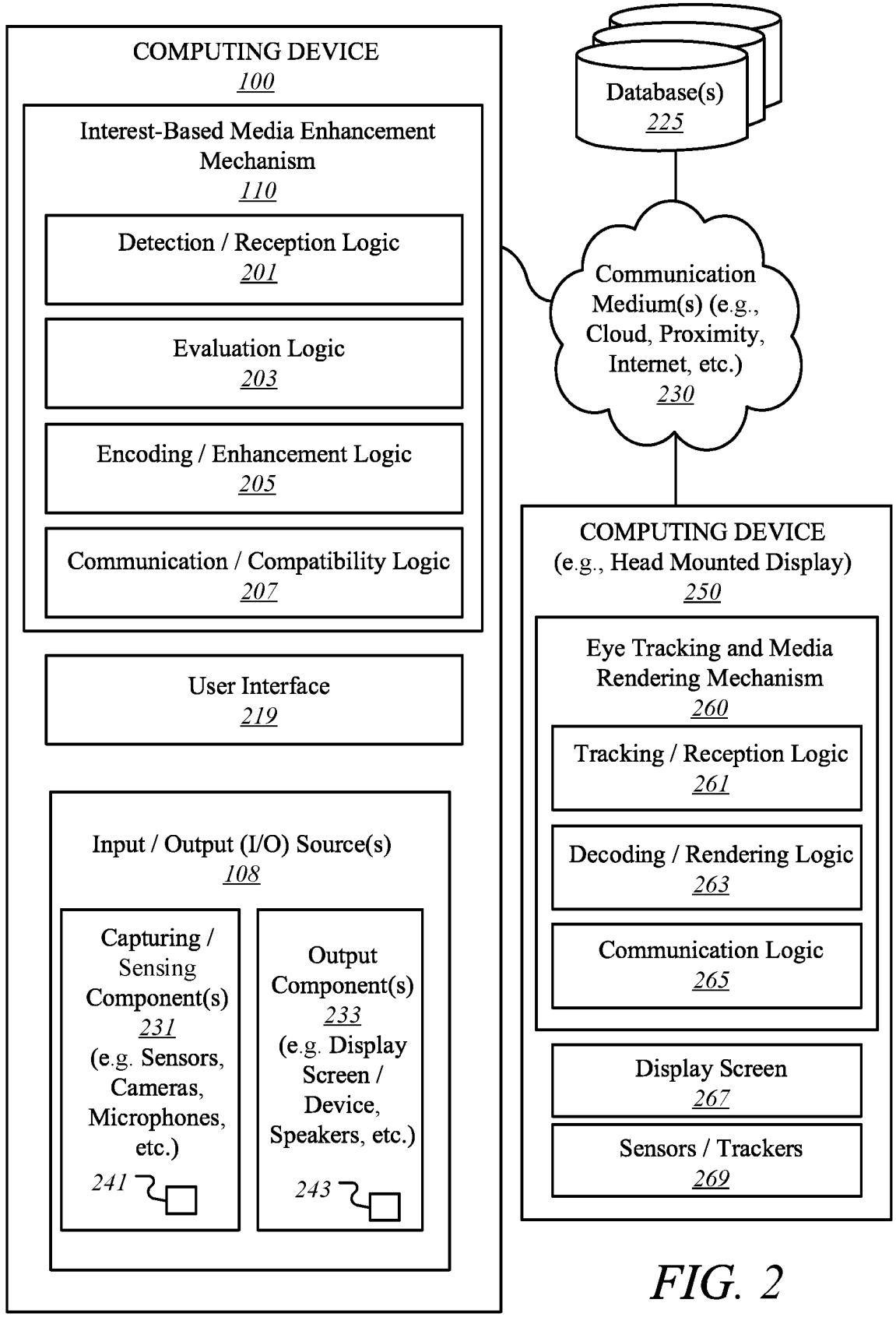
FIG. 2 illustrates an interest-based media enhancement mechanism according to one embodiment.

FIG. 2 illustrates enhancement mechanism 110 of FIG. 1 according to one embodiment. For brevity, many of the details already discussed with reference to FIG. 1 are not repeated or discussed hereafter. In one embodiment, enhancement mechanism 110 may include any number and type of components, such as (without limitations): detection/reception logic 201; evaluation logic 203; encoding/enhancement logic 205; and communication/compatibility logic 207.

Computing device 100 is further shown to include user interface 219 (e.g., graphical user interface (GUI)-based user interface, Web browser, cloud-based platform user interface, software application-based user interface, other user or application programming interfaces (APIs) etc.). Computing device 100 may further include I/O source(s) 108 having capturing/sensing component(s) 231, such as camera(s) 241 (e.g., Intel® RealSense™ camera), and output component(s) 233, such as display(s) 243 (e.g., integral displays, tensor displays, etc.).

Computing device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including capturing/sensing component(s) 231 and output component(s) 233. In one embodiment, capturing/sensing component(s) 231 may include sensor array (such as microphones or microphone array (e.g., ultrasound microphones), cameras or camera array (e.g., two-dimensional (2D) cameras, three-dimensional (3D) cameras, infrared (IR) cameras, depth-sensing cameras, etc.), capacitors, radio components, radar components, etc.), scanners, accelerometers, etc. Similarly, output component(s) 233 may include any number and type of display devices or screens, projectors, speakers, light-emitting diodes (LEDs), one or more speakers and/or vibration motors, etc.

As illustrated, computing device 100 may be in communication with another computing device 250, where computing device 100 may include and hereinafter referred to as a server computer, while computing device 250 may include and hereafter referred to as an HMD. In one embodiment, server computer 100 may host enhancement mechanism 110, while HMD 250 may host eye tracking and media rendering mechanism ("tracking/rendering mechanism") 260. In another embodiment, HDM 250 may host both enhancement mechanism 110 and tracking/rendering mechanism 260. In yet another embodiment, HMD 250 may host or have access to both enhancement mechanism 110 and tracking/rendering mechanism 260, but depending on the availability and extent of the system resources at HMD 250, tasks may be alternated between HMD 250 and server computer 100. For example, small tasks that are not overly power-consuming, memory-consuming, etc., may be performed at HMD 250, while larger tasks requiring greater amount of system resources may be performed at server computer 100.

In the illustrated embodiment, HMD 250 is shown as hosting tracking/rendering mechanism 260 including any number and type of components, such as (without limitations): tracking logic 261; decoding/rendering logic 263; and communication logic 265. HMD 250 is further shown as having display screen 267 for rendering and displaying of contents, such as still images, videos, etc., and one or more sensors/trackers 269 for sensing, scanning, or tracking a number of things, such as the user's eyes, pupils, iris, etc. It is contemplated that HMD 250 may contain any number and type of other computing and processing components, such as I/O sources, user interface, etc., but for the sake of brevity, such details are contemplated and not shown.

For example, in one embodiment, tracking/reception logic 261 may be used to track the size of the user's pupil along with other factors that are capable of influencing pupil size. It is contemplated that the user may refer to a person having access to and using or wearing HMD 250. In one embodiment, this tracked information may then be collected and communicated over to enhancement mechanism 110 at server computer 100 over one or more communication mediums 230 (e.g., cloud network, Internet, proximity network, etc.) as facilitated by communication logic 265 and communication/compatibility logic 207.

At enhancement mechanism 110, detection/reception logic 201 may be used to receive this collection of tracked information and forwards it on to evaluation logic 203 for further processing and analysis, such as for detection ROI and determining whether the user's interest in ROI is due to the contents being rendered as part of ROI or for other reasons (such as changes in surrounding lights, weather, noise, movement, etc.). If, for example, it is determined that the user's pupil size is dilated because of the user being interested in the contents of the ROI, then encoding/enhancement logic 205 may be used to increase or enhance the quality of the media being delivered as part of the ROI to provide the user with a better experience of contents at least within the ROI.

This enhanced version of the media may then be encoded by encoding/enhancement logic 205 and forwarded on to HMD 250 over communication medium(s) 230 (e.g., cloud network, Internet, proximity network, etc.) as facilitated by communication/compatibility logic 207 and communication logic 265. In one embodiment, tracking/reception logic 261 may receive this enhanced version of the media and forwards it on to decoding/rendering logic 263 to then decode the media and render it on display screen 267 for the user to view and experience.

It is contemplated that pupil size or a translated size of a pupil at certain distances (e.g., 1 meter) from HMD 250 or the relative size of the pupil with respect to the iris of the eye may be measured using one or more sensors/trackers 269 (e.g., cameras, eye trackers, iris scanners, movement/size sensors, etc.). It is contemplated that pupil size is linked to illumination on the eyes of the user, such as due to visual stimuli as well as other forms of emotional and physical arousal and excitement, such as happiness, anxiety, love, touch, etc., can have an impact on the size of the pupil. For example, a sudden turning on of the light in the room or the touch of a loved one can expand the size of the pupil. Now, since this can happened for any number of reasons while suing HMD 250, it is therefore determined that any changes in the size of the user's pupil is due to the user's interest in the contents within the ROI and not due to some external influences, such as lighting, touching, etc.

While visual contents can have significant influence on the pupil size, but to ensure that the change in the pupil size is an indication of the user's interest in certain visual contents, evaluation logic 203 is used to evaluate and perform this distinction as to whether the user's pupil size was changed due to the user's interest in contents or other influences evaluation logic 203. For example, evaluation logic 203 may detect, monitor, and evaluate certain indicators that are representative of other influences in order to determine whether the change in the pupil size is due to the user's interest in the contents.

It is to be noted and contemplated that this novel technique is not limited to merely any particular form of media ant that it is application to and implemented with all forms of media, such as still images, audio, video, etc. Embodiments provide for a novel technique to propose an increase in video and audio bitrate when the user finds certain media contents of interest by detecting instances of pupil dilation due to actual visual stimulation and not simply due to other instances as listed above. For example, when the pupils are not dilated, the bitrate and the corresponding image quality may be set to nominal values as in a normal foveated rendering of contents.

In one embodiment, this novel technique may be applied to tethered (such as wired) or untethered (such as wireless) HMDs, such as HMD 250. As described earlier, in some embodiments, tracking/rendering mechanism 260 hosted by HMD 250 may be responsible for performing eye and pupil size tracking using one or more of sensors/trackers 269 as facilitated by tracking/reception logic 261. Any information obtained from this tracking may then be communicated or fed back to enhancement mechanism 110 at server computer 100, which triggers evaluation logic 203 to evaluate the information to look for parameters or other clues to determine whether the change in pupil size was due to interest in contents or other factors playing a role.

Based on its findings and if the pupil size is determined to have been changed due to interest in contents, evaluation logic 203 then instructs encoding/enhancement logic 205 to create an ROI based on the user's gaze/foveated region and adjust the quality of the ROI based on the users' pupil size, etc. Once the ROI has been determined and created, encoding/enhancement logic 205 may then concede the video frame and send this data to HMD 250 through communication/compatibility logic 207 over communication medium(s) 230.

Once received by tracking/reception logic 261 at HMD 250, this encoded and enhanced media is then decoded by decoding/rendering logic 263 and rendered using display screen 267. In one embodiment, this communication between server computer 100 and HMD 250 may be continuous and non-stop; while, in another embodiment, it is done over regular intervals or periods of time; while, in yet another embodiment, it is done upon occurrence of an event, such as updates to software, etc.; while, in yet another embodiment, it done on-demand. Further, this cycle of creating and encoding of ROI may be repeated based on the new eye data, where a foveated frame may be correspondingly created and sent over to HMD 250 for decoding and rendering.

For example, in some embodiments, once the user's interest in certain contents is identified, appropriate bitrate adjustments (or other quality parameters) may be made to improve the quality of what is rendered in the foveated region. In some embodiments, other variations of image quality improvements may be made as described earlier. The extent of improvements or reduction in quality may be derived from machine learning-based methods for the particular user with respect to content affinity and ratings over time. Moreover, user variations in pupil size to brightness relationship may be determined by the system by various learning algorithms and user preferences.

It is contemplated that increasing the quality of video, images, and audio, in response to the user's interest in contents is likely to increase the user's interest in those contents and would lead to an improved experience for the user. For example, during these instances and apart from increasing bitrate of foveated regions as described above, in one embodiment, it is contemplated that the entire media's quality may be improved and not just the quality of the ROI. In some cases, along with the quality of ROI, the quality of other regions, such as those surrounding the ROI, may also be enhanced, offering the user a high level of media experience.

For example, in some cases, foveated rendering may be switched on or off if the user is particularly interested in the content being rendered. Further, when applied to normal foveated rendering, the bitrate between the foveated region and other regions may be increased, while retaining the overall bandwidth requirements the same, but improving the quality of the region that interests the user. For example, when applied in wired systems, benefits for reducing compute and power may be taken into consideration to take advantage of various foveated/ROI schemes. As aforementioned, this novel technique may also be applied to computing systems, such as HMD 250, where all or most of processing and foveated region creation, etc., may be performed at HMD 250 instead of at other devices, such as server computer 100, where associated benefits may be in reduced computing and power consumption may be achieved.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 207 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing devices 100, 250. In another example, "logic" may refer to or include a hardware component that is capable of being physically installed along with or as part of one or more system hardware elements, such as an application processor, a graphics processor, etc., of a computing device, such as computing devices 100, 250. In yet another embodiment, "logic" may refer to or include a firmware component that is capable of being part of system firmware, such as firmware of an application processor or a graphics processor, etc., of a computing device, such as computing devices 100, 250.

Further, any use of a particular brand, word, term, phrase, name, and/or acronym, such as "eye tracking", "iris scanning", "pupil tracking", "pupil size", "interest in content", "region of interest", "ROI", "encoding", "decoding", "enhancement", "rendering", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from enhancement mechanism 110 and/or tracking/rendering mechanism 260 to facilitate various embodiments including adding, removing, and/or enhancing certain features. For brevity, clarity, and ease of understanding of enhancement mechanism 110 and/or tracking/rendering mechanism 260, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
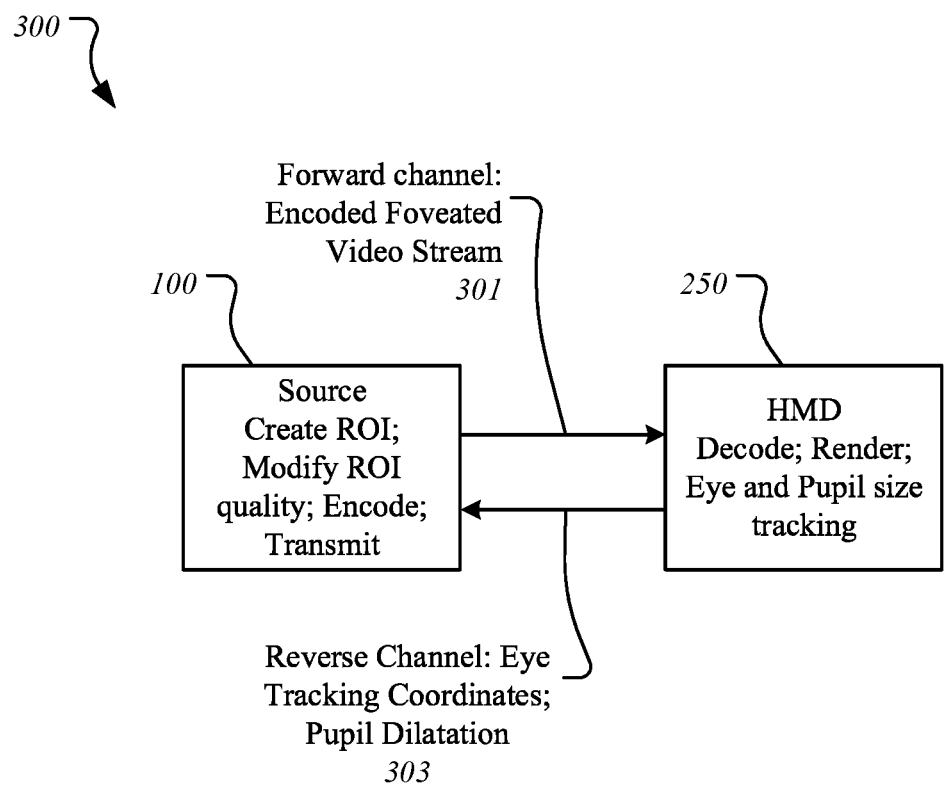
FIG. 3A illustrates a system placement according to one embodiment.

FIG. 3A illustrates a system placement 300 according to one embodiment. For brevity, many of the details previously discussed with reference to FIGS. 1-2 may not be discussed or repeated hereafter. Any processes relating to system placement 300 may be performed by processing logic that may comprise hardware (e.g., circuitry, dedicated logic, programmable logic, etc.), software (such as instructions run on a processing device), or a combination thereof, as facilitated by enhancement mechanism 110 and/or tracking/rendering mechanism 260 of FIG. 2. The processes associated with system placement 300 may be illustrated or recited in linear sequences for brevity and clarity in presentation; however, it is contemplated that any number of them can be performed in parallel, asynchronously, or in different orders. Further, embodiments are not limited to any particular architectural placement, framework, transaction sequence, and/or structure of components and/or processes, such as system placement 300.

As described with reference to FIG. 2, system placement 300 employs a couple of computing devices, such as a server computer as source 100 and an HMD as sink 250. As illustrated, source 100 pay perform one or more tasks like creating ROI, modifying ROI quality, encoding, transmitting enhanced media, and/or the like, using host enhancement mechanism 100 while communicating encoded foveated media (e.g., video stream) to sink 250 through forward channel 301 over a communication network (e.g., Internet, Bluetooth, proximity, etc.). Similarly, sink 250 performs decoding and rendering of the media, tracking of the user's eyes, pupil size, etc., using tracking/rendering mechanism 260, while communicating eye tracking coordinates, pupil dilation, etc., to source 100 through reverse channel 303 over a communication network.

Figure 3B:
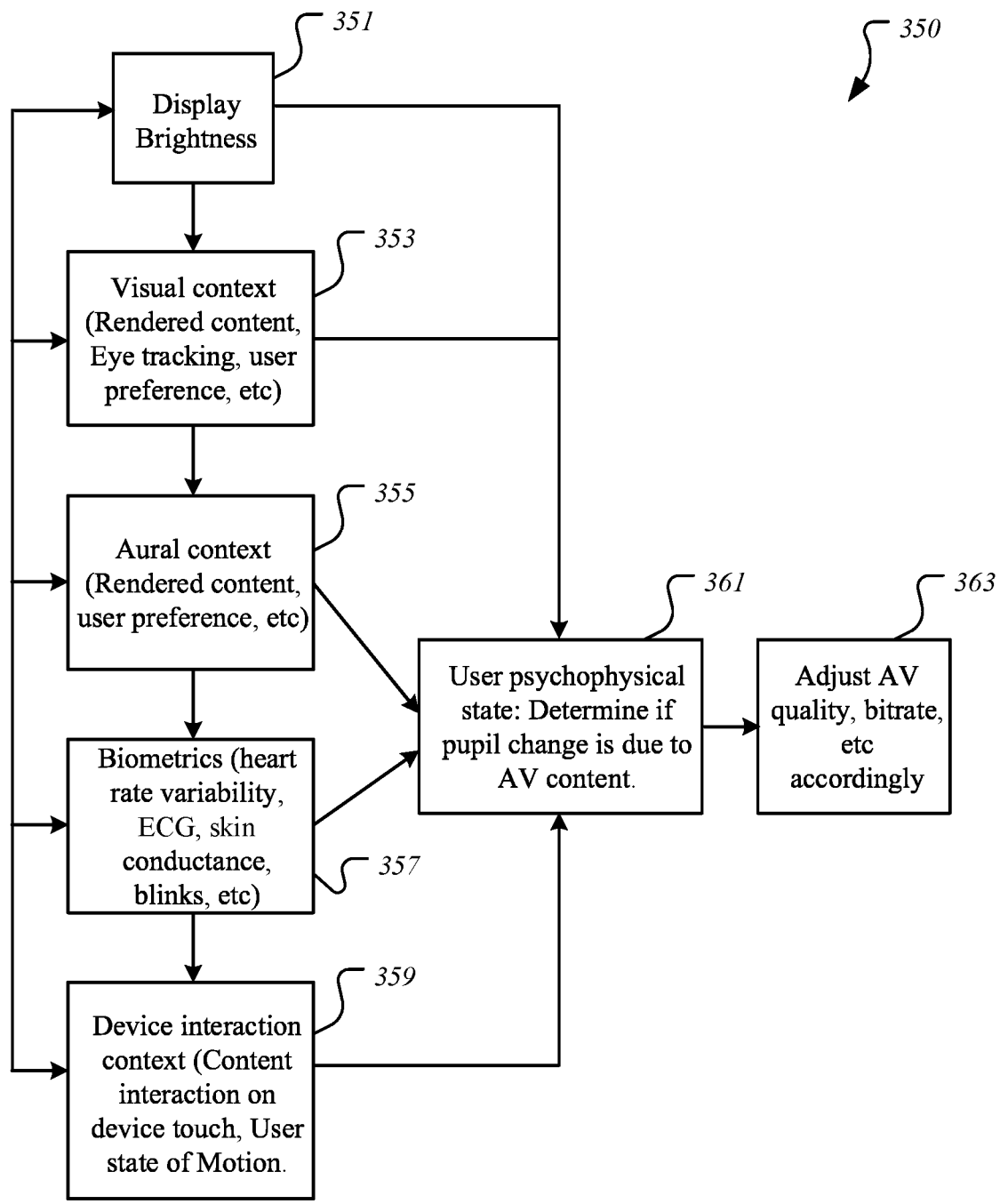
FIG. 3B illustrates a transaction sequence using adjustment factors for foveated media quality based on user's interest in content according to one embodiment.

FIG. 3B illustrates a transaction sequence 350 using adjustment factors for foveated media quality based on user interest in contents according to one embodiment. For brevity, many of the details previously discussed with reference to FIGS. 1-3A may not be discussed or repeated hereafter. Any processes relating to transaction sequence 350 may be performed by processing logic that may comprise hardware (e.g., circuitry, dedicated logic, programmable logic, etc.), software (such as instructions run on a processing device), or a combination thereof, as facilitated by enhancement mechanism 110 and/or tracking/rendering mechanism 260 of FIG. 2. The processes associated with transaction sequence 350 may be illustrated or recited in linear sequences for brevity and clarity in presentation; however, it is contemplated that any number of them can be performed in parallel, asynchronously, or in different orders.

In the illustrated embodiment, adjustment factors may include (without limitations) display brightness 351, visual context 353, aural context 355, biometrics 357, and device interaction context 359, and/or the like, that are then used to prepare and consider user psychophysical state 361 (such as whether pupil dilation is due to interest in contents). As illustrated, audio-visual (AV) media quality bitrate, etc., may then be adjusted based on user psychophysical state 361.

Figure 4A:
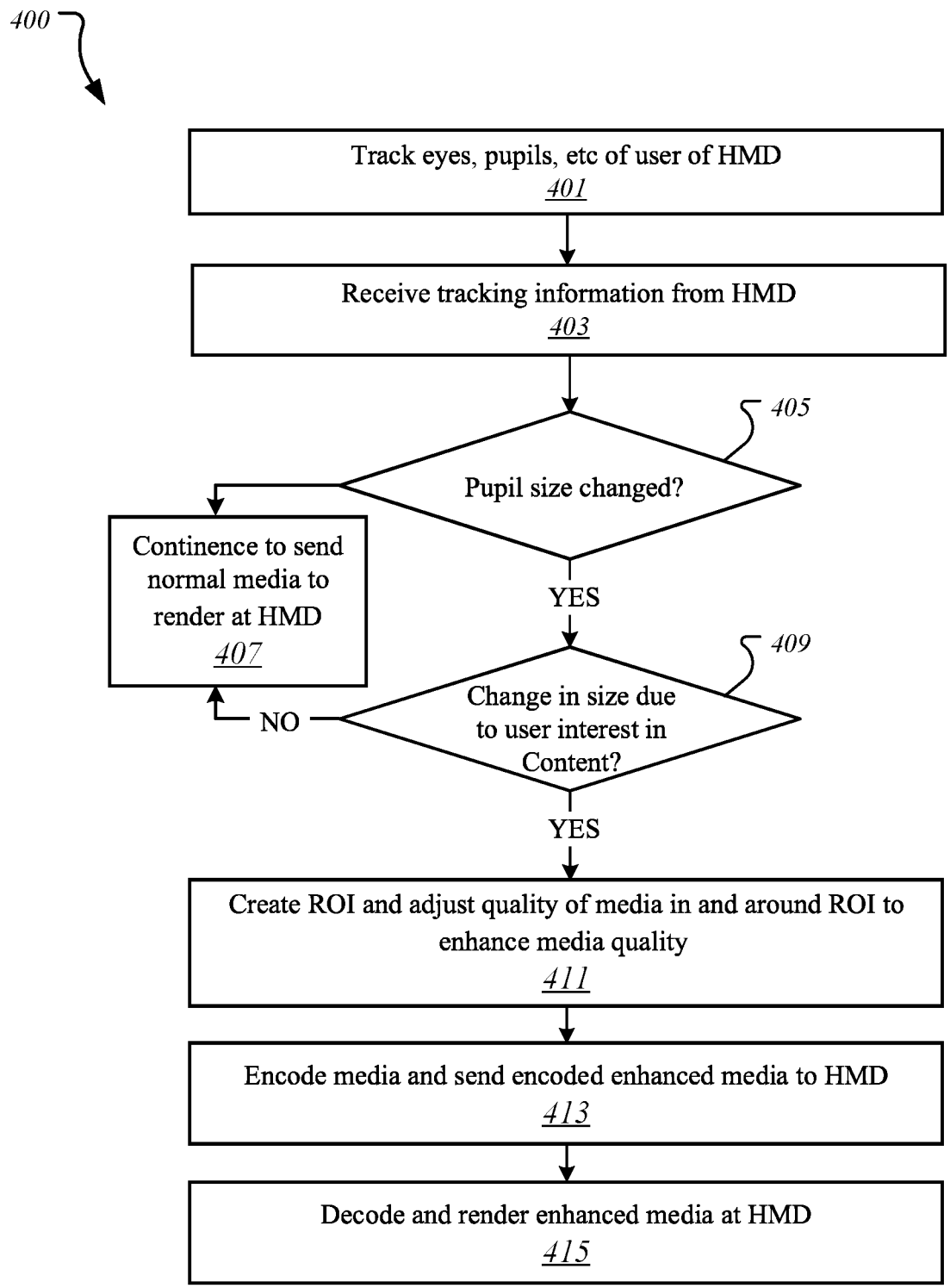
FIG. 4A illustrates a method for preparing and rending enhanced media based on user interest according to one embodiment.

FIG. 4A illustrates a method 400 for preparing and rendering enhanced media based on user interest according to one embodiment. For brevity, many of the details previously discussed with reference to FIGS. 1-3B may not be discussed or repeated hereafter. Any processes relating to method 400 and transaction sequences 420, 450, 460 and 480 of FIGS. 4B, 4C, 4D and 4E, respectively, may be performed by processing logic that may comprise hardware (e.g., circuitry, dedicated logic, programmable logic, etc.), software (such as instructions run on a processing device), or a combination thereof, as facilitated by enhancement mechanism 110 and/or tracking/rendering mechanism 260 of FIG. 2. The processes associated with method 400 and transaction sequences 420, 450, 460, 480 may be illustrated or recited in linear sequences for brevity and clarity in presentation; however, it is contemplated that any number of them can be performed in parallel, asynchronously, or in different orders.

Method 400 begins at block 401 with tracking of eyes, pupils, etc., at a wearable computing device, such as HMD, where this tracking information is collected and transmitted over to another computing device, such as server computer over a communication network, etc. This tracking information is received at block 403 and evaluates to determine whether there was any change in the size of the pupil of the user of the HMD at block 405. If not, at block 407, media (e.g., images, videos, etc.) of normal quality is communicated form the server computer to the HMD for rendering of this media at the HMD using one or more display screens. If, however, there has been a change in the pupil size of the user, then, at block 409, another determination is made as to whether this change is due to user interest in certain contents of the media or because of changes in or occurrence of other factors, such as light, environment, weather, human touch, accident, horror, excitement, etc., surrounding the user.

If the pupil size did not change due to the user's interest in contents, then method 400 continues at block 407. If the changes were due to the user's interest in contents, then, in one embodiment, an ROI is created encompassing the contents of interest to the user and then, at the ROI portion of the media is adjusted for quality of media, such that the quality of the contents of the ROI (or portions of the media surrounding the ROI or to the whole media) is enhance for superior user experience at the HMD at block 411. At block 413, the enhanced media is encoded and the encoded enhanced media is sent over to the HMD over a communication network. At block 415, the HMD receives the encoded enhanced media, decodes it, and renders the contents of the media on a display screen of the HMD for viewing by the user.

Figure 4B:
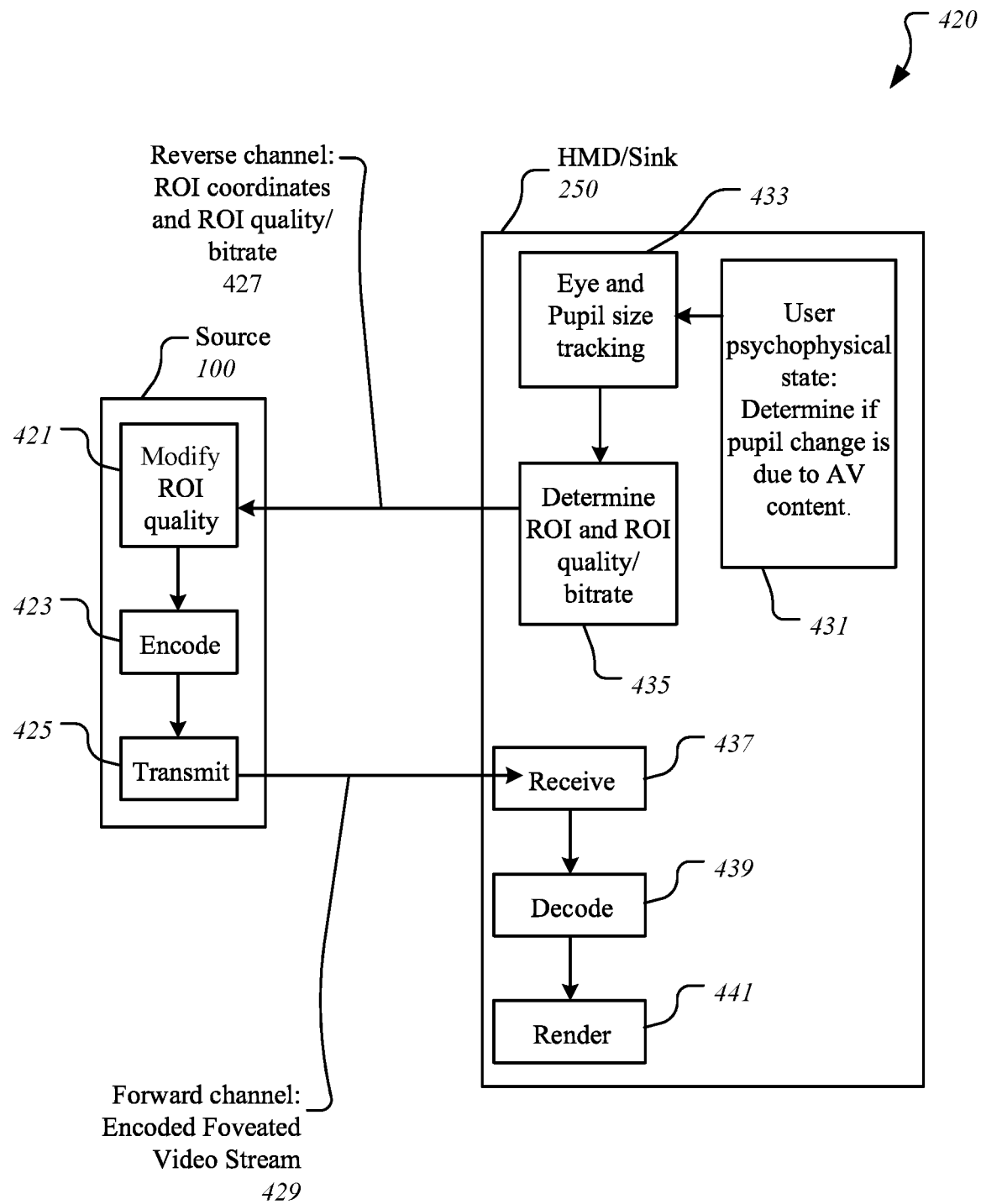
FIG. 4B illustrates a transaction sequence for determining region of interest on a sink device according to one embodiment.

FIG. 4B illustrates a transaction sequence 420 for determining ROI on a sink device 250 according to one embodiment. For brevity, many of the details previously discussed with reference to FIGS. 1-4A may not be discussed or repeated hereafter. As illustrated here, sink device 250 may include a wearable computing device, such as an HMD, while a source device 100 may include any computing device, such as a server computer, a desktop computer, a mobile device, etc. In the illustrated embodiment, at sink device 250, a user's psychological state is determined if the change in the size of the user's pupil is due the user's interest in the audio-visual (AV) contents at 431. In one embodiment, this is determined through eye and pupil size tracking at 433 and computing the ROI and ROI quality/bitrate at 435.

In one embodiment, reverse channel 427 provides for ROI coordinates and ROI quality and bitrate to be communicated on to source device 100, where ROI quality is modified at 421, encoded at 423, and subsequently, transmitted 425 on to sink device 250 through forward channel 429 to carry the encoded foveated video stream over one or more networks, such as a cloud network, a proximity network, and the Internet. At sink device 250, the encoded video stream is received at 437, decoded at 439, and subsequently, the contents of the video stream are rendered at 441 using a display screen.

Figure 4C:
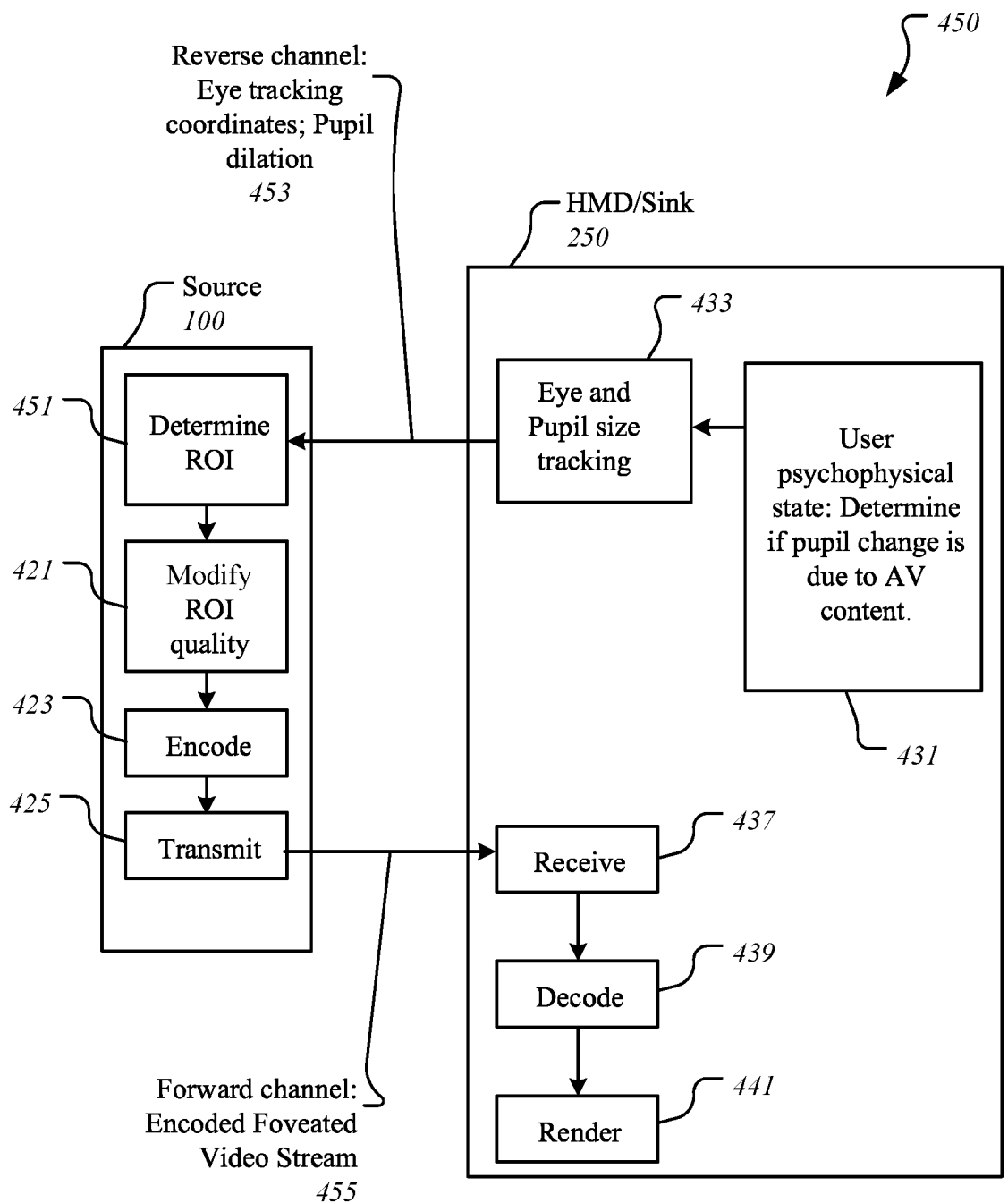
FIG. 4C illustrates a transaction sequence for determining region of interest on a source device according to one embodiment.

FIG. 4C illustrates a transaction sequence 450 for determining ROI on a source device 100 according to one embodiment. For brevity, many of the details previously discussed with reference to FIGS. 1-4B may not be discussed or repeated hereafter. As illustrated here, at sink device 250, a user's psychological state is determined if the change in the size of the user's pupil is due the user's interest in AV content at 431, where this is determined through eye and pupil size tracking at 433.

In one embodiment, reverse channel 453 provides for communication eye tracking coordinates, pupil dilation, etc., on to source device 100, where ROI is determined at 451, ROI quality is modified at 421, encoded at 423, and subsequently, transmitted 425 on to sink device 100 through a forward channel 455 to carry the encoded foveated video stream over one or more networks, such as a cloud network, a proximity network, and the Internet. At sink device 250, the encoded video stream is received at 437, decoded at 439, and subsequently, the contents of the video stream are rendered at 441 using a display screen.

Figure 4D:
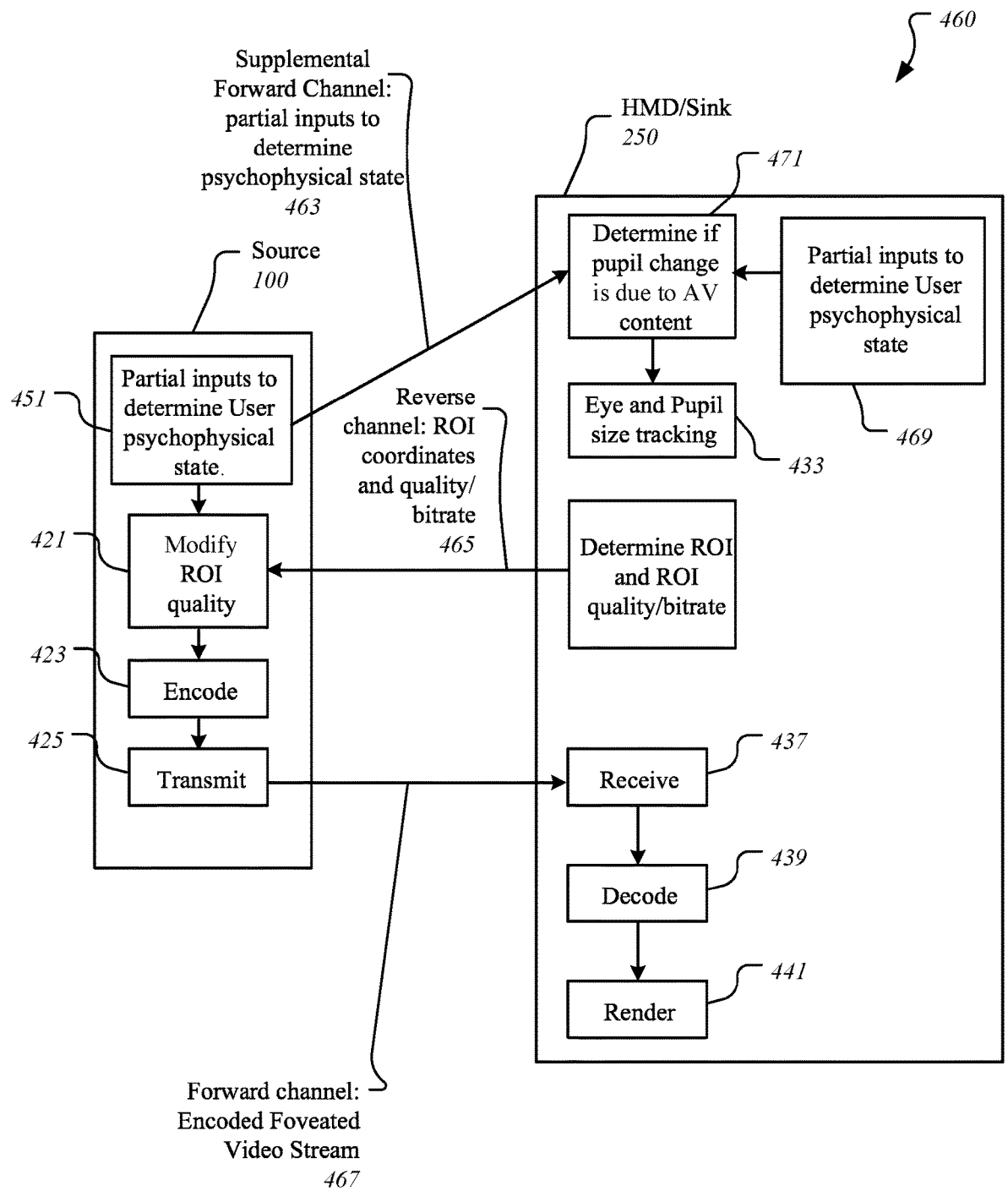
FIG. 4D illustrates a transaction sequence using inputs to determine psychophysical state according to one embodiment.

FIG. 4D illustrates a transaction sequence 460 using inputs to determine psychophysical state according to one embodiment. For brevity, many of the details previously discussed with reference to FIGS. 1-4C may not be discussed or repeated hereafter. As illustrated here, at source device 100, partial inputs to determine user psychophysical state are gathered at 461 and using supplemental forward channel 463, these partial inputs are communicated over to sink device 250, where partial input 469 are used to determine if pupil change is due to the user's interest in AV contents at 471. Further, at sink device 250, eye and pupil size tracking is used at 433 to determine ROI and ROI quality and bitrate at 435.

In one embodiment, over reverse channel 465, ROI coordinates and quality and bitrates are communicated over to source device 100 where ROI quality is modified at 421, encoded at 423, and transmitted at 425 over to sink device 250. At sink device 250, the encoded foveated video stream is received at 437 using forward channel 467, where this encoded video stream is decoded at 439, and then rendered at 441 using a display screen.

Figure 4E:
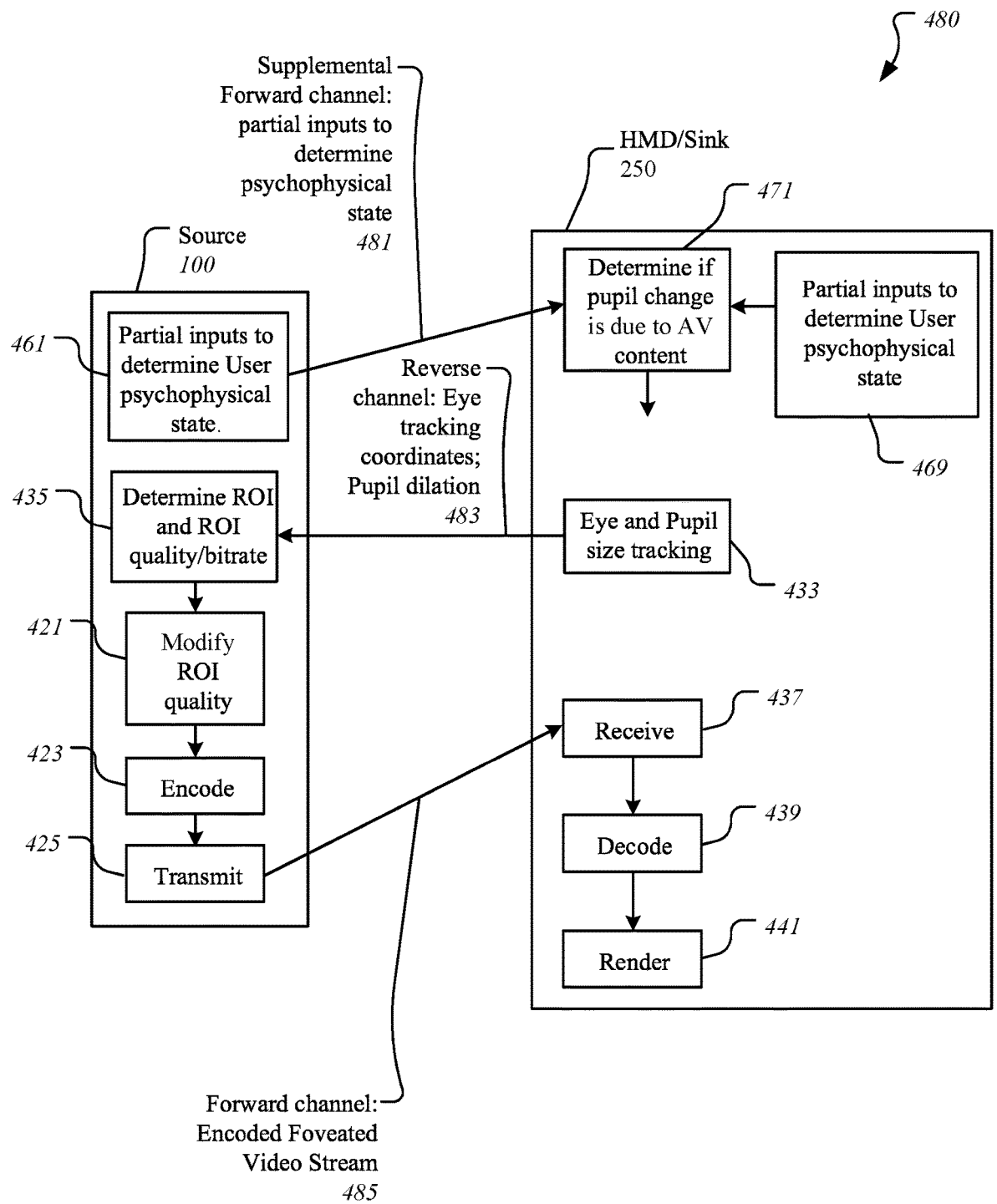
FIG. 4E illustrates a transaction sequence using inputs to determine psychophysical state according to one embodiment.

FIG. 4E illustrates a transaction sequence 480 using inputs to determine psychophysical state according to one embodiment. For brevity, many of the details previously discussed with reference to FIGS. 1-4D may not be discussed or repeated hereafter. As illustrated here, at source device 100, partial inputs to determine user psychophysical state are gathered at 461 and using supplemental forward channel 481, these partial inputs are communicated over to sink device 250, where partial input 469 are used to determine if pupil change is due to the user's interest in AV contents at 471. Further, at sink device 250, eye and pupil size tracking is performed at 433 and communicated over to source device 100 using reverse channel 483, where, at source device 100, ROI and its quality and bitrate are determined at 435.

This is followed by modifying of ROI quality at 421, encoding of ROI at 423, and transmitting at 425 of the encoded foveated video stream over to sink device 250 using forward channel 485. At sink device 250, the encoded video stream is received at 437, decoded 429, and rendered at 441 using a display screen.

Figure 5:
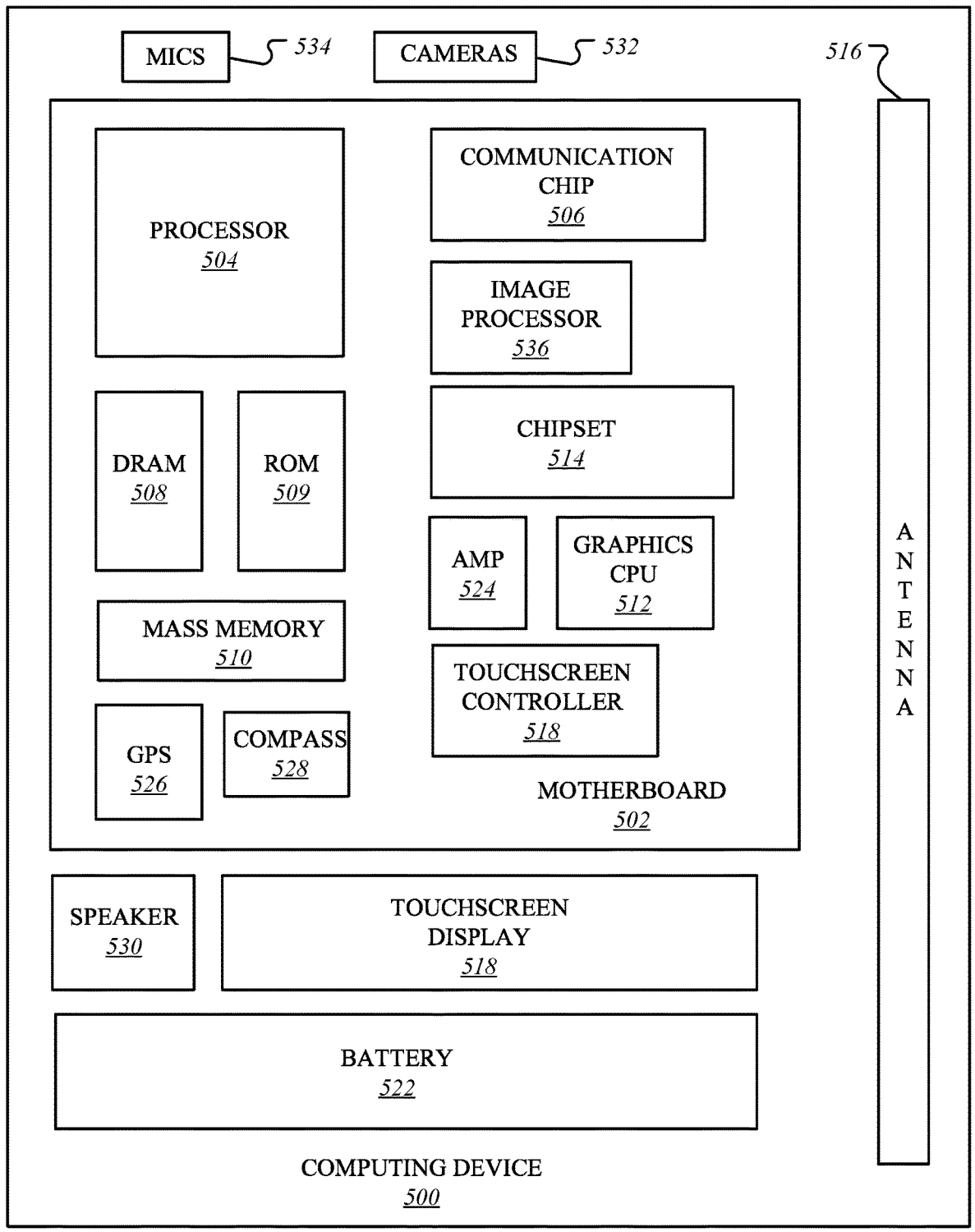
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
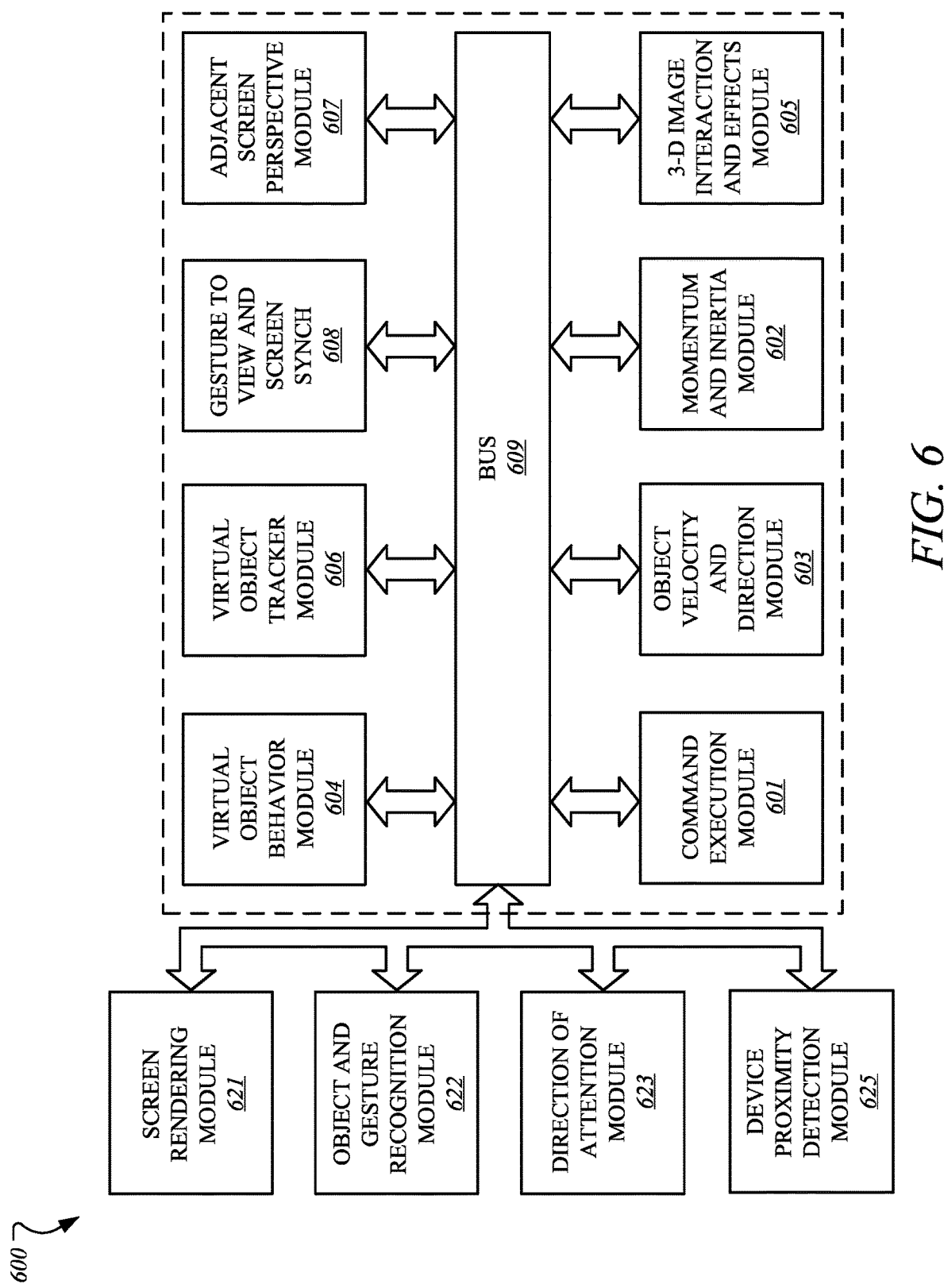
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate interest-based enhancement in media quality, the apparatus comprising: detection/reception logic to receive eye tracking information from a wearable computing device, wherein the eye tracking information contains data relating to pupils of eyes of a user having access to the wearable computing device; and encoding/enhancement logic to enhance quality of at least contents of media, if a size of a pupil is determined to have been altered due to the user's interest in the contents, wherein the media having the enhanced contents is encoded and communicated back to the wearable computing device to be rendered at the wearable computing device.

Example 2 includes the subject matter of Example 1, further comprising evaluation logic to determine whether the size of the pupil is altered due to the user having interest in contents of media being rendered at the wearable computing device, wherein the media includes at least one of one or more images and one or more videos.

Example 3 includes the subject matter of Examples 1-2, wherein whether the size of the pupil is altered due to the user's interest or other factors is determined based on a psychophysical state of the user.

Example 4 includes the subject matter of Examples 1-3, wherein the psychophysical state is obtained from evaluating one or more of display brightness, visual context, aural context, biometrics, and device interaction context, wherein the other factors include sudden brightness, change in weather, and touch of humans or pets.

Example 5 includes the subject matter of Examples 1-4, wherein the evaluation logic is further to create a region of interest (ROI) that encompassed the contents, wherein the enhanced media contains at least the ROI.

Example 6 includes the subject matter of Examples 1-5, wherein the wearable computing device comprises a head-mounted display to perform tracking of the eyes to obtain the eye tracking information, wherein the wearable computing device is further to decode and render the media having the enhanced contents.

Example 7 includes the subject matter of Examples 1-6, further comprising communication/compatibility logic to facilitate communication with the wearable computing device over one or more networks including one or more of a cloud network, a proximity network, and the Internet.

Some embodiments pertain to Example 8 that includes a method to facilitating interest-based enhancement in media quality, the method comprising: receiving eye tracking information from a wearable computing device, wherein the eye tracking information contains data relating to pupils of eyes of a user having access to the wearable computing device; and enhancing quality of at least contents of media, if a size of a pupil is determined to have been altered due to the user's interest in the contents, wherein the media having the enhanced contents is encoded and communicated back to the wearable computing device to be rendered at the wearable computing device.

Example 9 includes the subject matter of Example 8, further comprising determining whether the size of the pupil is altered due to the user having interest in contents of media being rendered at the wearable computing device, wherein the media includes at least one of one or more images and one or more videos.

Example 10 includes the subject matter of Examples 8-9, wherein whether the size of the pupil is altered due to the user's interest or other factors is determined based on a psychophysical state of the user.

Example 11 includes the subject matter of Examples 8-10, wherein the psychophysical state is obtained from evaluating one or more of display brightness, visual context, aural context, biometrics, and device interaction context, wherein the other factors include sudden brightness, change in weather, and touch of humans or pets.

Example 12 includes the subject matter of Examples 8-11, further comprising creating a region of interest (ROI) that encompassed the contents, wherein the enhanced media contains at least the ROI.

Example 13 includes the subject matter of Examples 8-12, wherein the wearable computing device comprises a head-mounted display to perform tracking of the eyes to obtain the eye tracking information, wherein the wearable computing device is further to decode and render the media having the enhanced contents.

Example 14 includes the subject matter of Examples 8-13, further comprising facilitating communication with the wearable computing device over one or more networks including one or more of a cloud network, a proximity network, and the Internet.

Some embodiments pertain to Example 15 that includes a graphics processing system comprising a computing device having memory coupled to a processor, the processor to: receive eye tracking information from a wearable computing device, wherein the eye tracking information contains data relating to pupils of eyes of a user having access to the wearable computing device; and enhance quality of at least contents of media, if a size of a pupil is determined to have been altered due to the user's interest in the contents, wherein the media having the enhanced contents is encoded and communicated back to the wearable computing device to be rendered at the wearable computing device.

Example 16 includes the subject matter of Example 15, wherein the operations further comprise determining whether the size of the pupil is altered due to the user having interest in contents of media being rendered at the wearable computing device, wherein the media includes at least one of one or more images and one or more videos.

Example 17 includes the subject matter of Examples 15-16, wherein whether the size of the pupil is altered due to the user's interest or other factors is determined based on a psychophysical state of the user.

Example 18 includes the subject matter of Examples 15-17, wherein the psychophysical state is obtained from evaluating one or more of display brightness, visual context, aural context, biometrics, and device interaction context, wherein the other factors include sudden brightness, change in weather, and touch of humans or pets.

Example 19 includes the subject matter of Examples 15-18, wherein the operations further comprise creating a region of interest (ROI) that encompassed the contents, wherein the enhanced media contains at least the ROI.

Example 20 includes the subject matter of Examples 15-19, wherein the wearable computing device comprises a head-mounted display to perform tracking of the eyes to obtain the eye tracking information, wherein the wearable computing device is further to decode and render the media having the enhanced contents.

Example 21 includes the subject matter of Examples 15-20, wherein the processor comprises a graphics processor, wherein the graphics processor is co-located with an application processor on a common semiconductor package.

Example 22 includes at least one non-transitory or tangible machine-readable medium comprising a plurality of instructions, when executed on a computing device, to implement or perform a method as claimed in any of claims or examples 8-14.

Example 23 includes at least one machine-readable medium comprising a plurality of instructions, when executed on a computing device, to implement or perform a method as claimed in any of claims or examples 8-14.

Example 24 includes a system comprising a mechanism to implement or perform a method as claimed in any of claims or examples 8-14.

Example 25 includes an apparatus comprising means for performing a method as claimed in any of claims or examples 8-14.

Example 26 includes a computing device arranged to implement or perform a method as claimed in any of claims or examples 8-14.

Example 27 includes a communications device arranged to implement or perform a method as claimed in any of claims or examples 8-14.

Example 28 includes at least one machine-readable medium comprising a plurality of instructions, when executed on a computing device, to implement or perform a method or realize an apparatus as claimed in any preceding claims.

Example 29 includes at least one non-transitory or tangible machine-readable medium comprising a plurality of instructions, when executed on a computing device, to implement or perform a method or realize an apparatus as claimed in any preceding claims.

Example 30 includes a system comprising a mechanism to implement or perform a method or realize an apparatus as claimed in any preceding claims.

Example 31 includes an apparatus comprising means to perform a method as claimed in any preceding claims.

Example 32 includes a computing device arranged to implement or perform a method or realize an apparatus as claimed in any preceding claims.

Example 33 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to:
   receive, in real-time, eye tracking information from a wearable computing device, wherein the eye tracking information contains data relating to pupils of eyes of a user having access to the wearable computing device;
   evaluate, in real-time, the data to determine whether a size of the pupil is altered due to one or more changes a psychological state or a biological state of the user having interest in one or more portions of contents of media being rendered at the wearable computing device, wherein evaluating the data further includes detecting a region of interest (ROI) and determining whether the ROI is due to the user's interest in the one or more portions of the content or one or more other reasons, wherein the ROI is created, dynamically modified, and repeatedly encoded based on the one or more changes in the physiological state or the biological state of the user as reflected by one or more modifications as identified by one or more variable elements associated with a combination of one or more factors including visual context, aural context, and biometrics, wherein the one or more variable elements include one or more of eye tracking associated with the visual context, rendered content or user preferences associated with the aural context, and heart rate or skin conductance associated with the biometrics; and
   enhance, in real-time, quality of the one or more portions of the contents, if the user is determined to have the interest in the one or more portions of the contents, wherein the enhanced one or more portions of the contents are communicated back to the wearable computing device to be rendered, in real-time, at the wearable computing device.

2. The apparatus of claim 1, wherein the media includes at least one of one or more images and one or more videos.

3. The apparatus of claim 1, wherein the one or more variable elements further comprise one or more of display brightness, device interaction context sudden brightness, change in weather, rendered content, blinks, and touch of humans or pets.

4. The apparatus of claim 1, wherein the ROI encompasses the contents, wherein the enhanced media contains at least the ROI.

5. The apparatus of claim 1, wherein the wearable computing device comprises a head-mounted display to perform tracking of the eyes to obtain the eye tracking information, wherein the wearable computing device is further to decode and render the media having the enhanced contents.

6. The apparatus of claim 1, wherein the one or more processors are further to facilitate communication with the wearable computing device over one or more networks including one or more of a cloud network, a proximity network, and the Internet.

7. A method comprising:
   receiving, real-time, eye tracking information from a wearable computing device, wherein the eye tracking information contains data relating to pupils of eyes of a user having access to the wearable computing device;
   evaluating, in real-time, the data to determine whether a size of the pupil is altered due to one or more changes in a psychological state or a biological state of the user having interest in one or more portions of contents of media being rendered at the wearable computing device, wherein evaluating the data further includes detecting a region of interest (ROI) and determining whether the ROI is due to the user's interest in the one or more portions of the content or one or more other reasons, wherein the ROI is created, dynamically modified, and repeatedly encoded repeatedly based on the one or more changes in the physiological state or the biological state of the user as reflected by one or more modifications as identified by one or more variable elements associated with a combination of one or more factors including visual context, aural context, and biometrics, wherein the one or more variable elements include one or more of eye tracking associated with the visual context, rendered content or user preferences associated with the aural context, and heart rate or skin conductance associated with the biometrics; and
   enhancing, in real-time, quality of the one or more portions of the contents, if the user is determined to have the interest in the one or more portions of the contents, wherein the enhanced one or more portions of the contents are communicated back to the wearable computing device to be rendered at the wearable computing device.

8. The method of claim 7, wherein the media includes at least one of one or more images and one or more videos.

9. The method of claim 7, wherein the one or more variable elements further comprise display brightness device interaction context sudden brightness, change in weather, rendered content, blinks, and touch of humans or pets.

10. The method of claim 7, wherein the ROI encompasses the contents, wherein the enhanced media contains at least the ROI.

11. The method of claim 7, wherein the wearable computing device comprises a head-mounted display to perform tracking of the eyes to obtain the eye tracking information, wherein the wearable computing device is further to decode and render the media having the enhanced contents.

12. The method of claim 7, further comprising facilitating communication with the wearable computing device over one or more networks including one or more of a cloud network, a proximity network, and the Internet.

13. At least one non-transitory machine-readable medium comprising instructions which, when executed by a computing device, cause the computing device to perform operations comprising:
   receiving, real-time, eye tracking information from a wearable computing device, wherein the eye tracking information contains data relating to pupils of eyes of a user having access to the wearable computing device;

evaluating, in real-time, the data to determine whether a size of the pupil is altered due to one or more changes in a psychological state or a biological state of the user having interest in one or more portions of contents of media being rendered at the wearable computing device, wherein evaluating the data further includes detecting a region of interest (ROI) and determining whether the ROI is due to the user's interest in the one or more portions of the content or one or more other reasons, wherein the ROI is created, dynamically modified, and repeatedly encoded based on the one or more changes in the physiological state or the biological state of the user as reflected by one or more modifications as identified by one or more variable elements associated with a combination of one or more factors including visual context, aural context, and biometrics, wherein the one or more variable elements include one or more of eye tracking associated with the visual context, rendered content or user preferences associated with the aural context, and heart rate or skin conductance associated with the biometrics; and enhancing, in real-time, quality of the one or more portions of the contents, if the user is determined to have the interest in the one or more portions of the contents, wherein the enhanced one or more portions of the contents are communicated back to the wearable computing device to be rendered at the wearable computing device.

14. The non-transitory machine-readable medium of claim 13, wherein the media includes at least one of one or more images and one or more videos.

15. The non-transitory machine-readable medium of claim 13, wherein the one or more variable elements further comprise one or more of display brightness, visual context, device interaction context, sudden brightness, change in weather, rendered content, blinks, and touch of humans or pets.

16. The non-transitory machine-readable medium of claim 13, wherein the ROI encompasses the contents, wherein the enhanced media contains at least the ROI.

17. The non-transitory machine-readable medium of claim 13, wherein the wearable computing device comprises a head-mounted display to perform tracking of the eyes to obtain the eye tracking information, wherein the wearable computing device is further to decode and render the media having the enhanced contents.

* * * * *